United States Patent [19]
Brunner

[11] 3,797,121
[45] Mar. 19, 1974

[54] DEVICE FOR MEASURING THE POSITION OF A CONDUCTOR IN A CABLE

[75] Inventor: Mathias Brunner, Magglingen/be, Switzerland

[73] Assignee: Zumbach Electronic Automatic, Berne, Switzerland

[22] Filed: Apr. 21, 1970

[21] Appl. No.: 30,544

[52] U.S. Cl. ............ 33/174 Q, 33/169 R, 33/169 F
[51] Int. Cl. .............................................. G01b 5/10
[58] Field of Search ........... 33/147 L, 174 R, 174 L, 33/174 Q, 174 P, 178 R, 169 F; 324/34 E

[56] References Cited
UNITED STATES PATENTS

| | | | |
|---|---|---|---|
| 1,196,789 | 9/1916 | Koelpin | 33/178 R |
| 2,073,365 | 3/1937 | Darlington | 33/178 R |
| 2,236,443 | 3/1941 | Oboler | 33/178 R |
| 3,169,323 | 2/1965 | Hold | 33/178 R |

FOREIGN PATENTS OR APPLICATIONS

| | | | |
|---|---|---|---|
| 244,638 | 5/1969 | U.S.S.R. | 33/174 R |
| 584,925 | 1/1947 | Great Britain | 33/174 L |
| 574,618 | 1/1946 | Great Britain | 324/34 E |

Primary Examiner—Louis R. Prince
Assistant Examiner—Charles E. Phillips

[57] ABSTRACT

A device for measuring the position of a conductor in a cable, insulated wire or the like, wherein at least one measuring head for measurement of the thickness of the insulation is turned to different measuring positions round the cable or wire, wherein said measuring head is mounted on a split ring rotatably mounted, the gap of said ring allowing insertion of the cable or wire into its measuring position in the axis of the ring at any time during production of the cable or wire.

7 Claims, 1 Drawing Figure

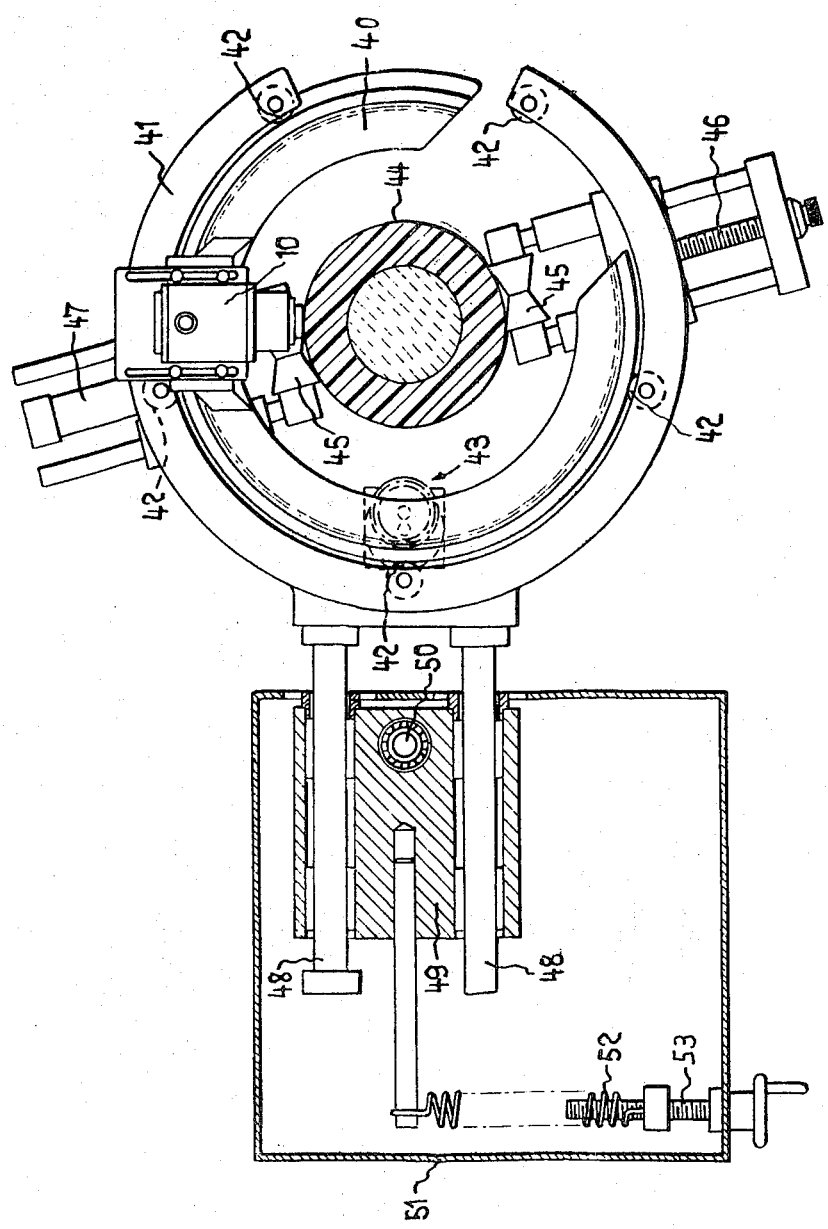

DEVICE FOR MEASURING THE POSITION OF A CONDUCTOR IN A CABLE

This invention relates to a device for measuring the position of a conductor in a cable, insulated wire or the like, wherein at least one measuring head is turned to different measuring positions round said cable or wire while the latter is fed through a measuring station. Measuring devices of this type are known, wherein one or more measuring heads are repeatedly swung to different positions round the cable or wire for measuring the thickness of the insulating layer along one mantle line of the cable or wire, differences in thickness along various mantle lines indicating an eccentricity of the conductor.

Prior devices of this type suffer from the drawback that the object to be measured has to be threaded through a passage of the measuring device in a relatively complicated way. However, during the initial phase of cable or wire production handling of the leading cable end is complicated enough even without the necessity of threading it through a measuring device. Further, once the cable or wire is running through the measuring device, there is no possibility of removing it from the measuring device. Thickened portions of the cable or wire which may occur where the cable is spliced, hardly pass through the measuring device or are liable to damage this device or to be damaged themselves.

It is an object of this invention to overcome these drawbacks by providing a measuring device wherein said measuring head is mounted on a split ring mounted for rotation in a plane perpendicular to the feeding direction of said cable or wire, said ring having a gap adapted for insertion of a cable or wire into its measuring position substantially in the axis of said ring. In this case the cable or wire may be inserted into the measuring device at any time during the manufacturing process through the gap of said ring, or vice versa, that is, the measuring device may laterally be shifted onto the cable or wire running through the producing plant. When obstacles such as thickened portions of the cable or wire arrive, it is very easy to remove the measuring device and to reinsert it when the obstacle has passed through the measuring position. When starting up the cable or wire production, the measuring device may be removed and thus does not hinder handling and treatment of the cable or wire, but the measuring device may easily and immediately be applied when the initial difficulties are overcome.

This invention will now be explained in detail with reference to the accompanying drawing showing an end view of the device, partially in section.

A measuring head 10 well known per se is radially adjustably mounted on a split ring 40. Ring 40 is rotatably mounted in an outer split annular structure 41 by means of rollers 42. A schematically indicated reciprocating drive 43 imparts to the ring 40 an oscillating movement at an amplitude of somewhat more than 300° as an example. A cable 44 to be tested is guided between rollers 45 radially adjustable by means of a hand-operated spindle 46 and a pneumatic cylinder 47 respectively. Structure 41 is mounted in a block 49 by means of guide rods 48 allowing shifting of the structure 41 with ring 40 in a substantially horizontal direction. Block 49 is pivotably mounted in a casing 51 by means of ball bearings and a shaft 50. A spring 52 of which the pull may be adjusted by means of spindle 53 compensates the torque exerted by the measuring system such that this system is maintained in a substantially horizontal position as illustrated.

During measurement the measuring head 10 is urged against the cable surface by spring action. The cable moves substantially in coaxial position with reference to parts 40 and 41, but such parts are displaceable in any direction and easily follow any possible curvature or lateral displacement of the cable. Therefore, no jamming may occur, because the measuring system always follows the cable without loading it. The relatively wide gaps of parts 40 and 41 allow insertion or removal of the cable through such gaps brought into registering position. Of course, stiff cables can hardly be shifted to the side for removal or insertion and therefore, the measuring device is displaceable for being removed from the cable or shifted onto the same. During removal or insertion of the cable the upper roller 45 and the measuring head 10 are lifted.

During measurement the measuring head is cyclically turned to different positions, for instance four positions spaced by 90° from each other, the thickness of the cable insulating being measured and indicated for each of these measuring positions in a manner well known in the art, for instance from U.S. Pat. No. 2,581,394. When differences of the measured thickness of the cable insulation occur in different positions the value and direction of eccentricity of the cable conductor in the insulating mantle may be determined from such differences.

What I claim is:

1. A device for measuring the position of a conductor in a cable, insulated wire or the like, comprising at least one measuring head mounted on a rigid split ring having a permanently open gap adapted for insertion of a wire into said ring, said split ring being rotatably mounted in a rigid supporting structure about the axis of said ring said rigid supporting structure having a permanently open gap adapted for passage of a wire and means for guiding said wire in a measuring position substantially in the axis of said ring, and driving means for rotating said ring and measuring head respectively to different angular measuring positions about said rigid supporting structure and to a position wherein said gaps cover each other allowing insertion of said wire.

2. A device according to claim 1 wherein said ring supporting structure and ring are suspended for lateral displacement perpendicularly to the axis of said cable or wire.

3. A device according to claim 2, wherein said supporting structure and ring are suspended by a mechanism for compensating its weight.

4. A device according to claim 2 wherein said supporting structure is shiftably mounted in a swingable carrier.

5. A device according to claim 4, wherein the torque acting from said ring and supporting structure respectively onto said carrier is compensated by a spring.

6. A device according to claim 1, wherein said supporting structure comprises a split annular casing having a gap of a width corresponding to the width of said gap of said ring, said gap of the annular casing allowing insertion of said cable or wire into its measuring position.

7. A device for testing a cylindrical object running through the device, comprising a rigid split ring having a permanently open gap allowing passage of said object therethrough into the interior of said ring, a measuring head mounted on said ring for testing said object passing through said ring, a supporting structure on which said ring is rotably mounted and said supporting structure having guide means for guiding said object, said structure allowing access to said gap for insertion or removal of said object through said gap, driving means for rotating said ring and measuring head about the axis of said ring within said supporting structure, and suspension means resiliently carrying said supporting structure and ring respectively and allowing displacement in a plane perpendicular to the axis of said object and including compensating means for compensation of the weight of said supporting structure and ring.

* * * * *